(12) United States Patent
Sano et al.

(10) Patent No.: US 7,828,124 B2
(45) Date of Patent: Nov. 9, 2010

(54) ELECTRIC DISK BRAKE

(75) Inventors: Kazumoto Sano, Chuo (JP); Takuya Usui, Yokohama (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 0 days.

(21) Appl. No.: 12/546,947

(22) Filed: Aug. 25, 2009

(65) Prior Publication Data

US 2010/0051395 A1    Mar. 4, 2010

(30) Foreign Application Priority Data

Aug. 29, 2008   (JP) .............................. 2008-221799

(51) Int. Cl.
*F16D 65/36* (2006.01)
(52) U.S. Cl. ...................... 188/156; 188/162
(58) Field of Classification Search .............. 192/219.4; 188/156–164
See application file for complete search history.

(56) References Cited

U.S. PATENT DOCUMENTS

| | | | | |
|---|---|---|---|---|
| 4,561,527 | A * | 12/1985 | Nakamoto et al. | 192/219.4 |
| 6,227,626 | B1 * | 5/2001 | Blattert | 303/20 |
| 6,626,270 | B2 * | 9/2003 | Drennen et al. | 188/72.1 |
| 7,299,905 | B2 * | 11/2007 | Yamaguchi et al. | 188/156 |

FOREIGN PATENT DOCUMENTS

| | | |
|---|---|---|
| JP | 2005-9633 | 1/2005 |
| JP | 2007-203821 | 8/2007 |

* cited by examiner

*Primary Examiner*—Christopher P Schwartz
(74) *Attorney, Agent, or Firm*—Wenderoth, Lind & Ponack, L.L.P.

(57) ABSTRACT

An electric disk brake is capable of determining an abnormality of a parking brake mechanism while the parking brake mechanism is in operation. A brake force is generated in the following manner. A rotation of an electric motor is slowed down by a differential speed reducing mechanism, and is converted into a linear motion by a ball ramp mechanism so as to advance a piston, which then presses a brake pad against a disk rotor to generate a brake force. A parking brake mechanism can lock a rotation of a rotor of the electric motor and maintain a braked state by rotating an engagement pawl through a plunger of a solenoid and causing the engagement pawl to be engaged with a ratchet wheel coupled to the rotor of the electric motor. A play is provided at a coupling portion of the engagement pawl and the plunger. The play enables the plunger to move within the range of the play while the engagement pawl is engaged with the ratchet wheel, thereby enabling the determination of whether the parking brake mechanism operates normally or abnormally based on whether the plunger moves or not upon application of an electric current to the solenoid while the parking brake mechanism is in an actuated state.

20 Claims, 12 Drawing Sheets

(A)

(B)

(C)

Fig. 3
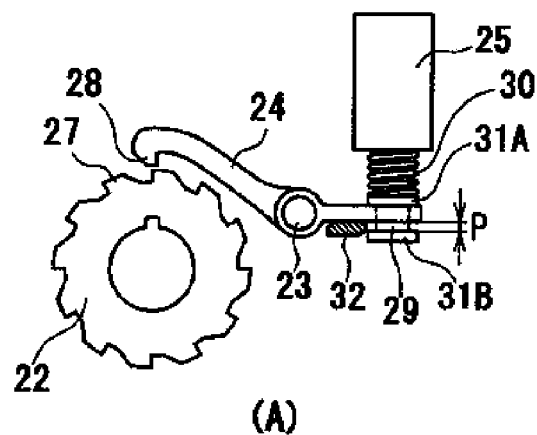
(A)
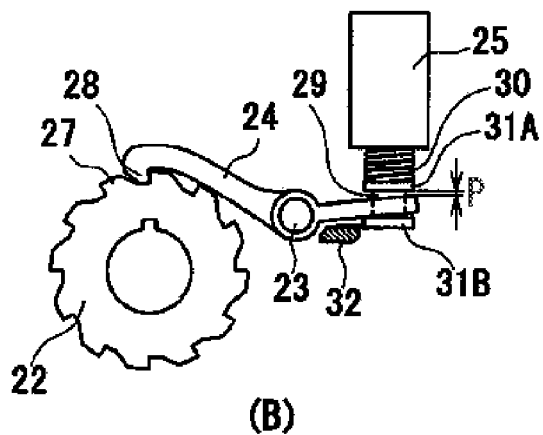
(B)
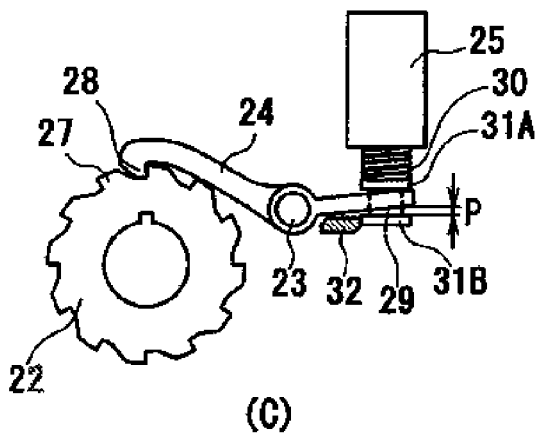
(C)

Fig. 6
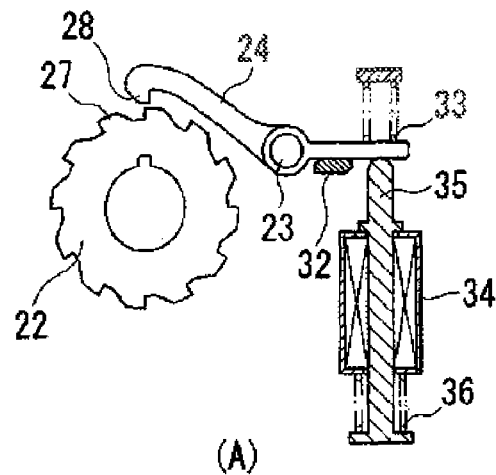
(A)
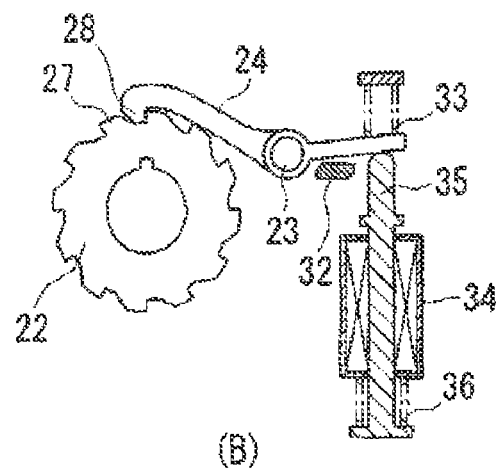
(B)
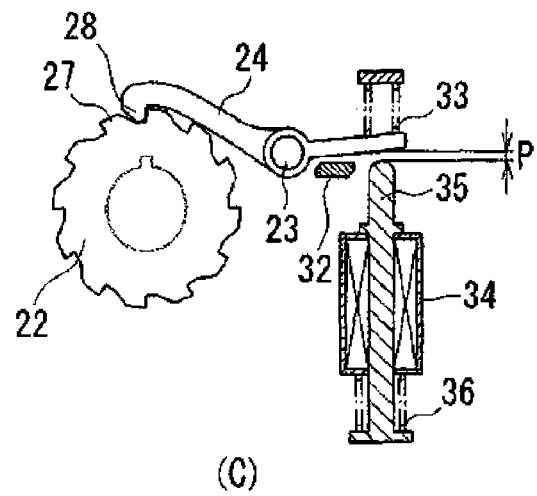
(C)

Fig. 8
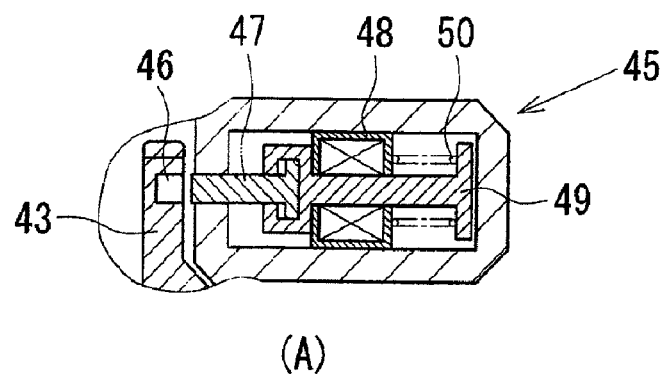
(A)
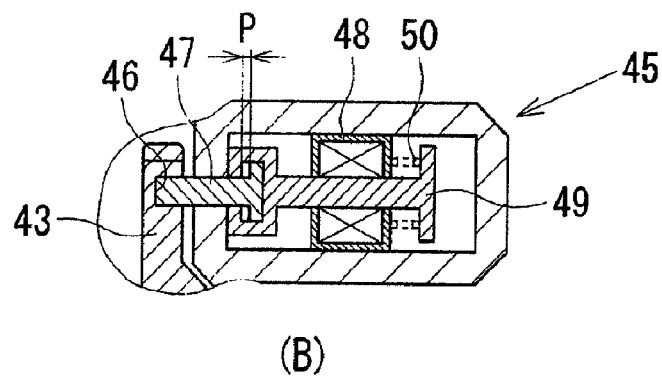
(B)
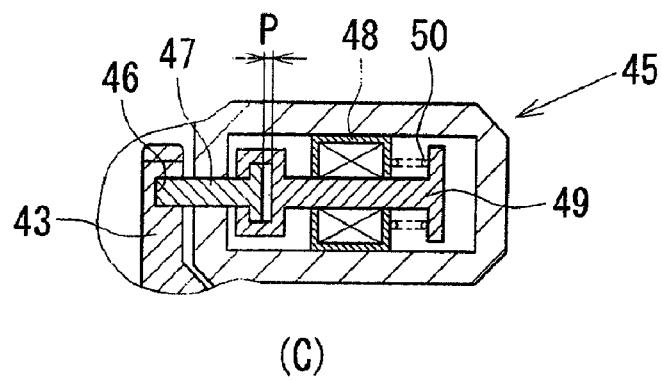
(C)

Fig. 12
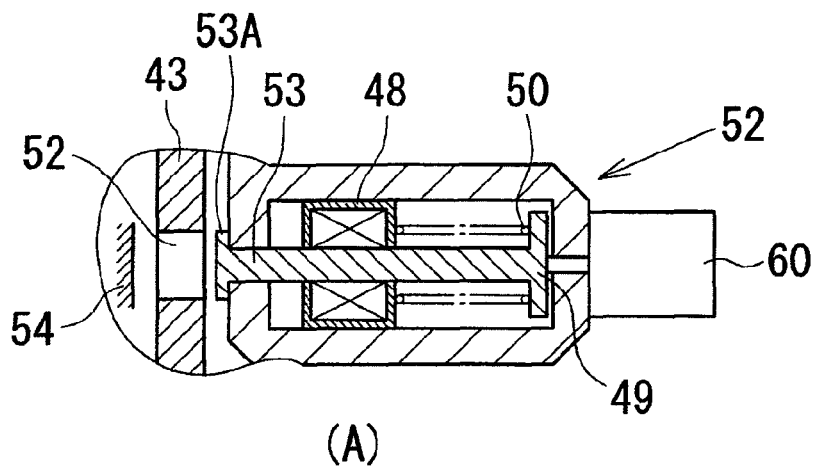
(A)
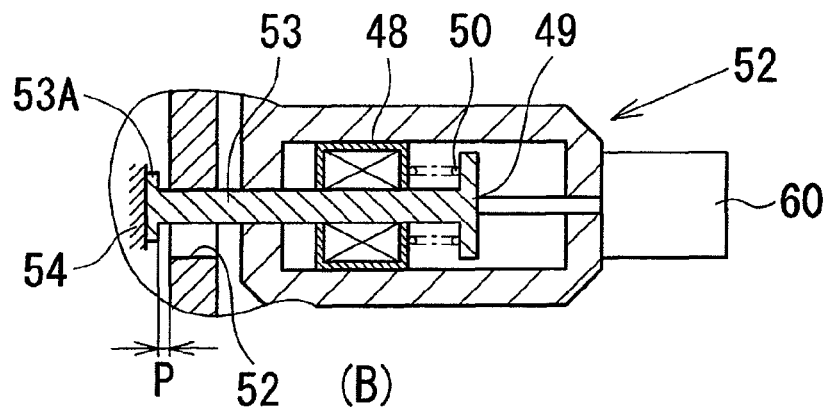
(B)
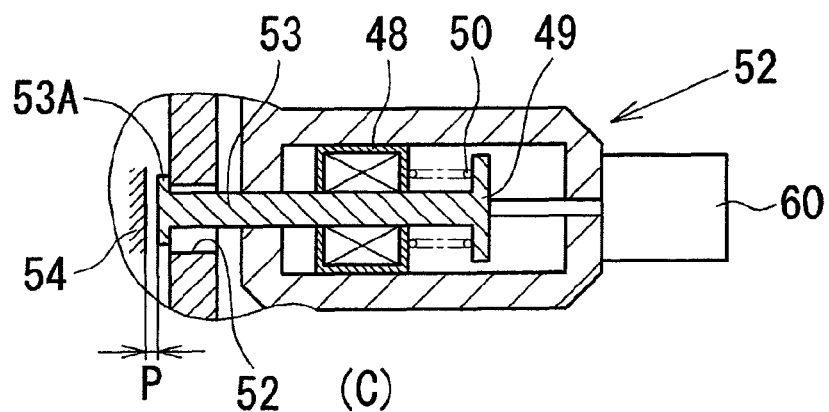
(C)

ELECTRIC DISK BRAKE

BACKGROUND OF THE INVENTION

The present invention relates to an electric disk brake operable to generate a brake force by pressing a brake pad against a disk rotor with use of an electric motor, and in particular, to an electric disk brake comprising a parking brake mechanism capable of holding a brake force while an electric current is not applied.

There is known an electric disk brake which generates a brake force by converting a rotation of a rotor of an electric motor into a linear motion of a piston through a rotation-linear motion converting mechanism, such as a ball screw mechanism or a ball ramp mechanism, and pressing a brake pad against a disk rotor by the piston. Such an electric disk brake can generate a desired brake force by detecting a force that a driver applies to a brake pedal (or a displacement amount of the brake pedal) with use of a sensor, and controlling a rotation of the electric motor based on the detection value with use of a control apparatus.

Some electric disk brakes of this kind comprise a parking brake mechanism capable of maintaining a braked state even after the application of an electric current to the electric motor is stopped by mechanically locking a rotation of the rotor of the electric motor, as disclosed in, for example, Japanese Patent Application Public Disclosure No. 2005-9633. The parking brake mechanism is configured as follows, so as to be able to maintain a braked state even when an electric current is not applied; that is, a ratchet wheel is attached to the rotor of the electric motor, and after the rotor of the electric motor is rotated to be situated at a brake position, the ratchet wheel is locked at that position by the engagement of an engagement pawl with a tooth of the ratchet wheel with use of a solenoid actuator.

As another example, Japanese Patent Application Public Disclosure No. 2007-203821 discloses an electric disk brake comprising a parking brake mechanism and being capable of determining an abnormality or a failure of a mechanical lock mechanism of the parking brake mechanism when the brake is not in operation.

In the above-mentioned electric disk brakes comprising the parking brake mechanism, the parking brake mechanism may be actuated while the brake pad and the disk rotor have a high temperature immediately after the vehicle is braked. In this case, the brake pad and the disk rotor thermally-expanded under the high temperature may be contracted due to a reduction in the temperature after a certain time has passed, resulting in a reduced brake force. Therefore, the need arises for preventing the reduction in the brake force by automatically re-actuating the parking brake mechanism after a certain time has passed while the vehicle is parked.

However, a problem may be derived from this re-actuation of the parking brake mechanism; if a vehicle is in such a state that the mechanical lock does not work properly due to a malfunction, once the mechanical lock is released for the purpose of automatic re-actuation of the parking brake mechanism while the vehicle is parked, the relock thereof is impossible, whereby the actuated state of the parking brake cannot be maintained. On the other hand, in the electric disk brake disclosed in Japanese Patent Application Public Disclosure No. 2007-203821, the abnormality determination can not be performed while the vehicle is parked since it is performed while the brake is not in operation.

SUMMARY OF THE INVENTION

An object of the present invention is to provide an electric disk brake capable of determining an abnormality of a parking brake mechanism while the brake is in operation.

To achieve the foregoing and other objects, the present invention provides an electric disk brake for generating a brake force by converting a rotational motion of a motor into a linear motion so as to advance a piston, and pressing a brake pad against a disk rotor by the piston; comprising:

a parking brake mechanism operable to hold a generated brake force by causing a solenoid to move a plunger so as to actuate a lock mechanism; and a control apparatus operable to control the solenoid;

wherein the plunger is movable in an actuating direction thereof at least while the lock mechanism is in a locked state; and the control apparatus comprises a parking brake mechanism abnormality determining unit operable to determine whether the parking brake mechanism operates normally or abnormally by applying an electric current to the solenoid so as to cause a movement of the plunger while the lock mechanism is in the locked state.

The parking brake mechanism abnormality determining unit may determines an abnormality of the solenoid based on the movement of the plunger.

The movement of the plunger may be detected based on an electric current supplied to the solenoid.

The parking brake mechanism abnormality determining unit may determine that the solenoid operates normally if the electric current supplied to the solenoid is reduced due to the movement of the plunger, or determines that the solenoid operates abnormally if the electric current supplied to the solenoid continues to increase during a predetermined time period.

The movement of the plunger may be detected based on a position of the plunger.

The movement of the plunger may be detected based on a change in an inductance of the solenoid.

The electric disk brake may further comprise a motor abnormality determining unit operable to determine whether the motor operates normally or abnormally by trying to rotate the motor in a direction causing the brake pad to be pressed against the disk rotor.

If the parking brake mechanism abnormality determining unit determines that the parking brake mechanism operates abnormally, a re-clamp operation, which is an operation of additionally causing the brake rotor to be pressed against the disk rotor while the parking brake mechanism is in operation, may be prohibited.

In a case where a vehicle has the electric disk brake for each of a plurality of wheels, when the re-clamp operation is prohibited in one of the wheels, a force of pressing the brake pad against the disk rotor in the re-clamp operation may be increased in the other wheels.

The present invention also provides an electric disk brake, comprising:

a motor;

a converting mechanism operable to convert a rotational motion of the motor into a linear motion;

a piston adapted to be advanced by the linear motion of the converting mechanism;

a brake pad adapted to be pressed against a disk rotor by the advance of the piston;

a parking brake mechanism operable to hold a brake force generated by the pressure of the brake pad by a lock mechanism;

a control apparatus operable to control the parking brake mechanism and the motor; and the parking brake mechanism comprising a solenoid for moving a plunger operable to actuate the lock mechanism, wherein the plunger is movable in an actuating direction thereof within a predetermined range that does not cause a release of a locked state of the lock mechanism; and the control apparatus comprises a parking brake mechanism abnormality determining unit operable to determine whether the parking brake mechanism operates normally or abnormally based on the movement of the plunger when the plunger is supposed to move within the predetermined range while the lock mechanism is in the locked state.

The movement of the plunger may be detected based on an electric current supplied to the solenoid.

The movement of the plunger may be detected based on a change in an inductance of the solenoid.

The electric disk brake may further comprise a motor abnormality determining unit operable to determine whether the motor operates normally or abnormally by trying to rotate the motor in a direction causing the brake pad to be pressed against the disk rotor.

If the parking brake mechanism abnormality determining unit determines that the parking brake mechanism operates abnormally, a re-clamp operation, which is an operation of additionally causing the brake pad to be pressed against the disk rotor while the parking brake mechanism is in operation, may be prohibited The present invention further provides an electric disk brake, comprising:

a motor;

a converting mechanism operable to convert a rotational motion of the motor into a linear motion;

a piston adapted to be advanced by the linear motion of the converting mechanism;

a brake pad adapted to be pressed against a disk rotor by the advance of the piston;

a parking brake mechanism operable to hold a brake force generated by the pressure of the brake pad;

a control apparatus operable to control the parking brake mechanism and the motor; and the parking brake mechanism comprising a ratchet wheel adapted to rotate according to the rotational motion of the motor, an engagement pawl adapted to be engaged with any of a plurality of teeth of the ratchet wheel so as to prevent a rotation of the ratchet wheel, a plunger operable to cause the engagement pawl to be engaged with any tooth of the ratchet wheel, and a solenoid for moving the plunger, wherein the plunger is movable in an actuating direction thereof while the engagement pawl is engaged with any tooth of the ratchet wheel; and the control apparatus comprises a parking brake mechanism abnormality determining unit operable to determine that the parking brake mechanism operates abnormally upon detection that the plunger does not move when an electric current is applied to the solenoid while the engagement pawl is engaged with any tooth of the ratchet wheel.

The parking brake mechanism abnormality determining unit may determine that the solenoid operates normally if the electric current supplied to the solenoid is reduced due to the movement of the plunger, or determines that the solenoid operates abnormally if the electric current supplied to the solenoid continues to increase during a predetermined time period.

A play allowing the plunger to move in the actuating direction thereof may be provided between the plunger and the engagement pawl.

A play allowing the plunger to move in the actuating direction thereof may be provided between the engagement pawl and any tooth of the ratchet wheel.

In advance of the operation of the control apparatus for moving the plunger, the ratchet wheel may be provided through the motor with a force for a rotation in a direction causing the brake pad to be pressed against the disk rotor, so that a load acting between the engagement pawl and the tooth is released while the engagement between the engagement pawl and the tooth is kept.

The electric disk brake may further comprise a motor abnormality determining unit operable to determine whether the motor operates normally or abnormally when the ratchet wheel is provided through the motor with the force for the rotation in the direction causing the brake pad to be pressed against the disk rotor.

According to the electric disk brake of the present invention, it is possible to determine an abnormality of the parking brake mechanism while the brake is in operation.

BRIEF DESCRIPTION OF THE DRAWINGS

FIG. 3s(A)-(C) are schematic views showing actuation of a parking brake mechanism of the electric disk brake shown in FIG. 1;

FIG. 6s(A)-(C) are schematic views showing actuation of a parking brake mechanism of an electric disk brake according to a second embodiment of the present invention;

FIG. 8s(A)-(C) are schematic views showing actuation of a parking brake mechanism of the electric disk brake shown in FIG. 7;

FIGS. 12(A)-(C) are schematic views showing actuation of a parking brake mechanism of an electric disk brake according to a fifth embodiment of the present invention.

DETAILED DESCRIPTION OF THE INVENTION

Hereinafter, embodiments of the present invention will be described in detail with reference to the accompanying drawings.

Figure 1:
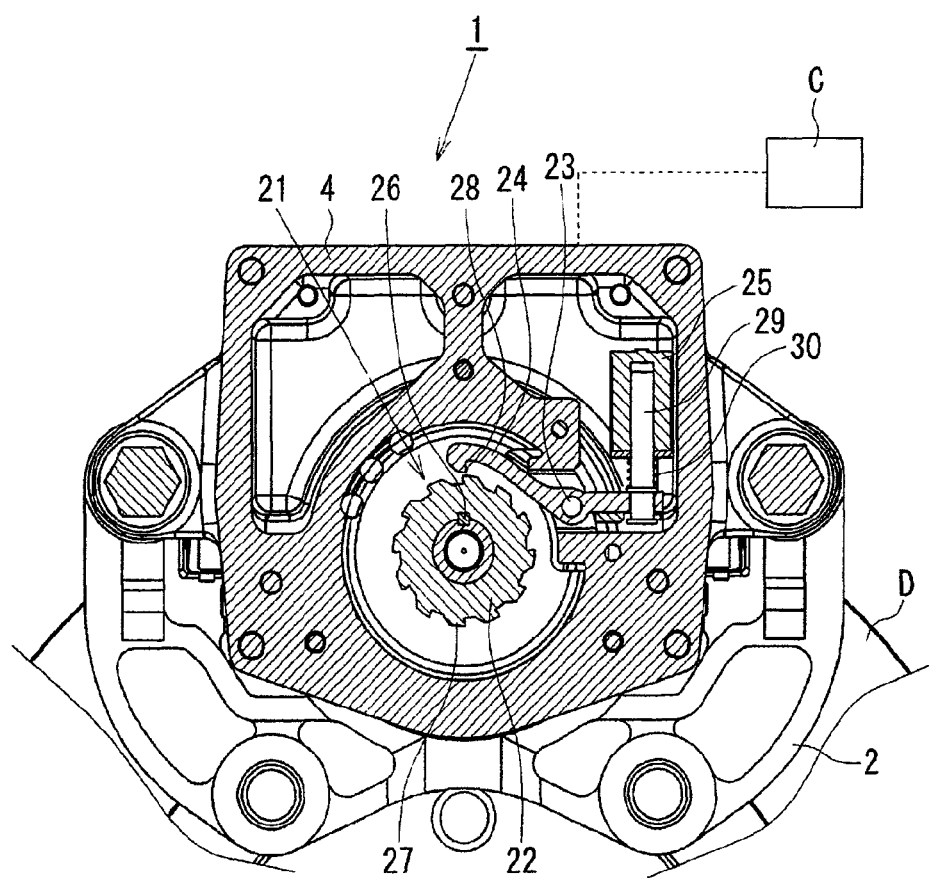
FIG. 1 is a vertical cross-sectional view taken along the line A-A in FIG. 2 showing an electric disk brake of a first embodiment of the present invention.
Figure 2:
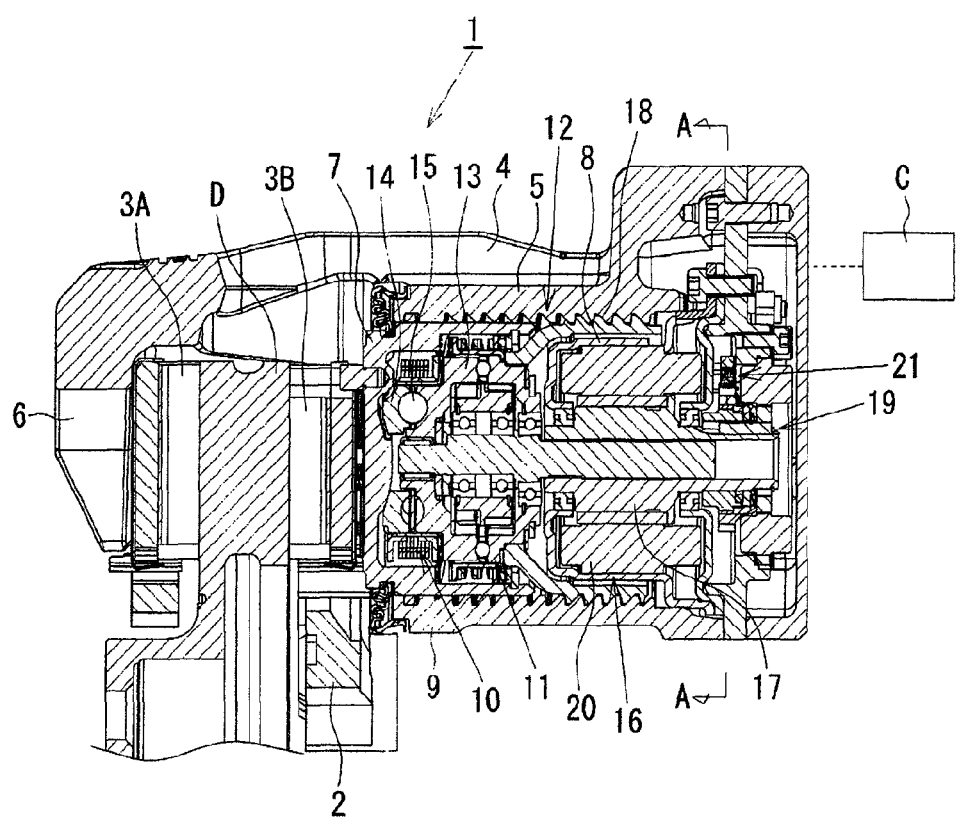
FIG. 2 is a vertical cross-sectional view of the electric disk brake shown in FIG. 1.

FIGS. 1 to 5 show a first embodiment of the present invention. As shown in FIGS. 1 and 2, an electric disk brake 1 of the first embodiment is embodied as a floating caliper type disk brake, and comprises a disk rotor D rotating according to a rotation of a wheel, a carrier 2 fixed to a non-rotating portion (not shown) on the vehicle body side such as a suspension member, a pair of brake pads 3A and 3B disposed on the respective sides of the disk rotor D and supported by the carrier 2, and a caliper main body 4 disposed so as to extend over or straddle the disk rotor D and supported so as to be movable along the axial direction of the disk rotor D relative to the carrier 2.

A cylindrical cylinder portion 5 and a claw portion 6 are integrally formed with the caliper main body 4. The cylinder portion 5 includes a through-hole open to one side of the disk rotor D. The claw portion 6 extends from the cylinder portion 5 to the opposite side of the disk rotor D so as to straddle the disk rotor D. A piston unit 7 and a motor unit 8 are disposed in the cylinder portion 5 of the caliper main body 4.

The piston unit 7 is formed by integrally assembling a bottomed cylindrical piston 9 slidably fitted in the cylinder portion 5, a ball ramp mechanism 10 and a differential speed reducing mechanism 11 contained within the piston 9, and a pad abrasion compensating mechanism 12. The ball ramp mechanism 10 comprises a rotation disk 13, a linear motion disk 14, and steel balls 15 disposed in an inclined groove between the rotation disk 13 and the linear motion disk 14. A relative rotation between the rotation disk 13 and the linear motion disk 14 causes a rolling motion of each of the balls 15 in the inclined groove, which in turn causes an axial relative displacement between the rotation disk 13 and the linear motion disk 14 according to a rotational angle between the disks 13 and 14. In this way, a rotational motion is converted to a linear motion. In the illustrated embodiment, the rotation-linear motion converting mechanism is embodied by the ball ramp mechanism 10, although it may be embodied by, for example, a ball screw mechanism, a roller ramp mechanism, or a precision roller screw mechanism.

The differential speed reducing mechanism 11 is interposed between the ball ramp mechanism 10 and an electric motor 16 of the motor unit 8. The mechanism 11 is adapted to reduce a rotational speed of a rotor 17 of the electric motor 16 according to a predetermined speed reducing ratio, and then transmit the slowed-down rotation to the rotation disk 13 of the ball ramp mechanism 10. The pad abrasion compensating mechanism 12 is adapted to automatically advance an adjusting screw 18 to cause an advance of the ball ramp mechanism 10 therewith when the brake pads 3A and 3B are abraded (or the contact positions of the pads with the disk rotor D are changed).

The motor unit 8 comprises the electric motor 16 and a resolver 26 built therein. The resolver 26 is operable to detect a rotational position of the electric motor 16. Application of an electric current to a coil of a stator 20 of the electric motor 16 causes the rotor 17 to rotate, whereby the ball ramp mechanism 10 is driven through the differential speed reducing mechanism 11. At this time, a rotational position of the rotor 17 is detected by the resolver 19. In addition, a parking brake mechanism 21 is disposed at the motor unit 8 for maintaining a rotational position of the rotor 17 of the electric motor 16.

Referring to FIGS. 1 to 3, the parking brake mechanism 21 comprises a ratchet wheel 22 attached to the rotor 17 of the electric motor 16, an engagement pawl 24 disposed on the outer circumferential side of the ratchet wheel 22 and rotatably supported by a pin 23, and a solenoid actuator 25 (hereinafter referred to as "solenoid 25") for driving the engagement pawl 24. The ratchet wheel 22 is fitted to the rear end (the right end in FIG. 2) of the rotor 17, and is fixed by a key 26 so as to be rotatable according to a rotation of the rotor 17. A number of teeth 27 are formed at regular intervals along the outer circumference of the ratchet wheel 22.

The engagement pawl 24 extends on the both sides of the pin 23 around which the engagement pawl 24 rotates. An engagement portion 28 is formed at one end of the engagement pawl 24, and engagement and disengagement of the engagement portion 28 with and from one of the teeth 27 of the ratchet wheel 22 is caused by a rotation of the engagement pawl 24 around the pin 23. The teeth 27 of the ratchet wheel 22 and the engagement portion 28 of the engagement pawl 24 each are formed to have a hook-like shape with a surface inclined in a certain direction, and serve as a lock mechanism preventing a rotation of the ratchet wheel 22 in the counterclockwise direction in FIG. 1 (brake releasing direction) when they are engaged with each other. A rotation of the ratchet wheel 22 in the clockwise direction (brake applying direction) generates a force for rotating the engagement pawl 24 in a direction causing the engagement pawl 24 to be disengaged from the tooth 27. In the first embodiment, the tooth 27 of the ratchet wheel 22 is formed to have a flat top and a flat bottom, although the tooth 27 may have another shape.

A plunger 29 is disposed at the solenoid 25 so as to be able to protrude from and be extracted into the solenoid 25 along the axial direction of the solenoid 25. The plunger 29 has a tip portion coupled with the other end of the engagement pawl 24 (the end of the engagement pawl 24 on the opposite side of the pin 23 or the rotation center from the end where the engagement portion 28 is formed). As a result, energization or de-energization of the solenoid 25 causes a rotation of the engagement pawl 24 so that the engagement portion 28 can be engaged with or disengaged from the tooth 27 of the ratchet wheel 22. More specifically, a compression spring 30 is disposed around the plunger 29. The compression spring 30 exerts a spring force acting on the plunger 29 so that the plunger 29 protrudes, and causing the engagement pawl 24 to abut against a stopper 32 and the engagement portion 28 to be disengaged from the tooth 27 of the ratchet wheel 22. Energization of the solenoid 25 causes a retraction of the plunger 29 into the solenoid 25 against the spring force of the compression spring 30, causing a rotation of the engagement pawl 24 so that the engagement portion 28 is engaged with the tooth 27 of the ratchet wheel 22.

As shown in FIG. 3, a play P is provided at the coupling portion of the plunger 29 and the engagement pawl 24. As shown in FIGS. 3(B) and 3(c), while the engagement portion 28 is engaged with the tooth 27 of the ratchet wheel 22, the plunger 29 is movable in the axial direction by a certain distance (play P) without causing a rotation of the engagement pawl 24.

In the illustrated embodiment, the coupling portion comprises a through-hole formed through the other end of the engagement pawl 24, the tip portion of the plunger 29 extending through the through-hole of the engagement pawl 24, and abutment portions 31A and 31B disposed at the tip portion of the plunger 29 so as to sandwich the other end of the engagement pawl 24 therebetween in a spaced apart relationship.

The space between the abutment portions 31A and 31B is provided so as to meet the following conditions; while the abutment portion 31B abuts against one side of the other end of the engagement pawl 24, a certain space (play P) is generated between the other side of the other end of the engagement pawl 24 and the abutment portion 31A (refer to FIG. 3(B)), and while the abutment portion 31A abuts against the other side of the other end of the engagement pawl 24, a certain space (play P) is generated between the one end of the other end of the engagement pawl 24 and the abutment portion 31B (refer to FIG. 3(C)).

As a result, as shown in FIGS. 3(B) and 3(C), the plunger 29 is movable along the axial direction of the solenoid 25 between the abutment portions 31A and 31B while the engagement portion 28 of the engagement pawl 24 is engaged with the tooth 27 of the ratchet wheel 22. Alternatively, for example, a certain play may be provided at the coupling portion by coupling the plunger 29 and the engagement pawl 24 by engagement of a pin provided in the plunger 29 and an elongated hole provided in the pawl 24, and moving the pin within the elongated hole.

The electric disk brake 1 comprises a control apparatus C operable to control operations of the electric motor 16 and the solenoid 25. On the basis of a brake operation performed by a driver and vehicle conditions, the control apparatus C performs a normal brake control, a parking brake control, and an abnormality determination control, all of which will now be described below.

[Normal Brake Control]

The normal brake control is performed in the following manner. The control apparatus C causes a control electric current to be supplied to the electric motor 16 based on a brake operation of a driver, thereby causing a rotation of the rotor 17. The rotation of the rotor 17 is slowed down by the differential speed reducing mechanism 11 at a predetermined speed reducing ratio, and is converted into a linear motion by the ball ramp mechanism 10 so as to advance the piston 9. The advance of the piston 9 causes the brake pad 3B, which is one of the brake pads, to be pressed against the disk rotor D. The reactive force at this time causes the caliper main body 4 to move, and thereby the claw portion 6 to press the brake pad 3A, which is the other of the brake pads, against the disk rotor D, whereby a brake force is generated. Abrasions of the brake pads 3A and 3B are compensated by an automatically-performed forward movement of the adjusting screw 18 of the pad abrasion compensating mechanism 12, which causes a forward movement of the ball ramp mechanism 10 according to the abrasions of the brake pads 3A and 3B.

The control apparatus C can control various sensors (not shown) such as a wheel speed sensor, an inclination sensor, and an acceleration sensor to detect vehicle conditions including a rotational speed of each wheel, a vehicle speed, a vehicle acceleration, a steering angle, a vehicle lateral acceleration, an inclination of a vehicle, and an amount of depression of an accelerator pedal. Then, the control apparatus C can control a rotation of the electric motor 16 based on these detections so as to perform a boosting control, an antilock brake control, a traction control, a vehicle stability control, a hill start aid control and the like.

[Parking Brake Control]

The parking brake control is performed in the following manner. For actuating the parking brake, firstly, the rotor 17 of the electric motor 16 is rotated in the brake applying direction so that the brake pads 3A and 3B are pressed against the disk rotor D with a desired force. While the brake pads 3A and 3B are pressed against the disk rotor D, the solenoid 25 is actuated so that the engagement portion 28 of the engagement pawl 24 is pressed against the tooth 27 of the ratchet wheel 22. At this moment, the engagement portion 28 and the tooth 27 may fail to be engaged with each other due to possible interference of their top portions. Then, the rotor 17 is rotated in the brake releasing direction so as to ensure that the engagement portion 28 and the tooth 27 are engaged with each other (refer to FIG. 3(B)). After that, the electric current application to the electric motor 16 is stopped. After confirmation of the pressing force of the brake pads 3A and 3B against the disk rotor D, the electric current application to the solenoid 25 is stopped, and the engagement portion 28 and the tooth 27 are maintained in the engaged state (refer to FIG. 3(C)). In this way, the vehicle can be maintained in the braked state even while electric current application to the electric motor 16 and the solenoid 25 is stopped.

For releasing the parking brake, an electric current is applied to the electric motor 16 but not to the solenoid 25 so that the rotor 17 is slightly rotated in the brake applying direction (the clockwise direction in the drawings), whereby the engagement between the engagement portion 28 of the engagement pawl 24 and the tooth 27 of the ratchet wheel 22 is loosened so that the engagement pawl 24 is rotated in the direction for disengaging the engagement portion 28 from the tooth 27 due to the spring force of the compression spring 30 (refer to FIG. 3(A)). Then, the rotor 17 of the electric motor 16 is rotated in the brake releasing direction, whereby the brake is released.

After a certain time has passed since the parking brake is actuated, the above-mentioned control for actuating the parking brake may be re-performed (hereinafter referred to as "re-clamp operation"), if necessary. Performing the re-clamp operation can prevent a reduction in the brake force of the parking brake, which might occur if the parking brake is actuated under a high temperature immediately after the vehicle is braked, since, in this case, the brake pads 3A and 3B and the disk rotor D are expected to contract as they cool down.

[Abnormality Determination Control]

The control apparatus C comprises an abnormality determining unit operable to perform the abnormality determination control which will now be described. The abnormality determination control is performed when the parking brake mechanism is in the actuated state shown in FIG. 3(C). Upon a start of the abnormality determination control, the abnormality determining unit of the control apparatus C actuates the plunger 29 by supplying a predetermined control electric current to the solenoid 25, and starts to monitor the operation of the plunger 29. At this time, the engagement pawl 24 is fixed due to the engagement of the engagement portion 28 and the tooth 27. However, since the play P is provided at the coupling portion of the plunger 29 and the engagement pawl 24, the plunger 29 can move in the axial direction thereof within the range of the play P, if the parking brake mechanism 21 operates normally. Therefore, the abnormality determining unit determines that the parking brake mechanism 21 operates normally if the plunger 29 moves, or determines that the parking brake mechanism 21 operates abnormally if the plunger 29 does not move.

A movement of the plunger 29 can be detected based on, for example, a change in the electric current applied to the solenoid 25 due to the movement of the plunger 29, or a change in the inductance of the solenoid 25. In this case, a threshold value may be set or an appropriate filter may be disposed for taking into consideration a noise content of the electric current.

When an abnormality of the parking brake mechanism 21 is detected, this abnormality is notified to a driver with use of an indicator such as a warning light or a warning buzzer, and the above-mentioned re-clamp operation of the parking brake while the vehicle is parked is cancelled, so that an unintentional release of the parking brake can be prevented. If the re-clamp operation is canceled in only one of wheels of a vehicle, the re-clamp operation may be performed in the other wheels in such a way that the brake forces thereto are increased so that a reduction in the total braking force of the parking brake can be prevented. Since the abnormality determination control can be performed without releasing the parking brake, an unintentional release of the parking brake during an abnormality determination process can be prevented.

Now, an exemplary control flow of the abnormality determination control performed by the abnormality determining unit of the control apparatus C will be described with reference to the flow chart shown in FIG. 4.

Figure 4:
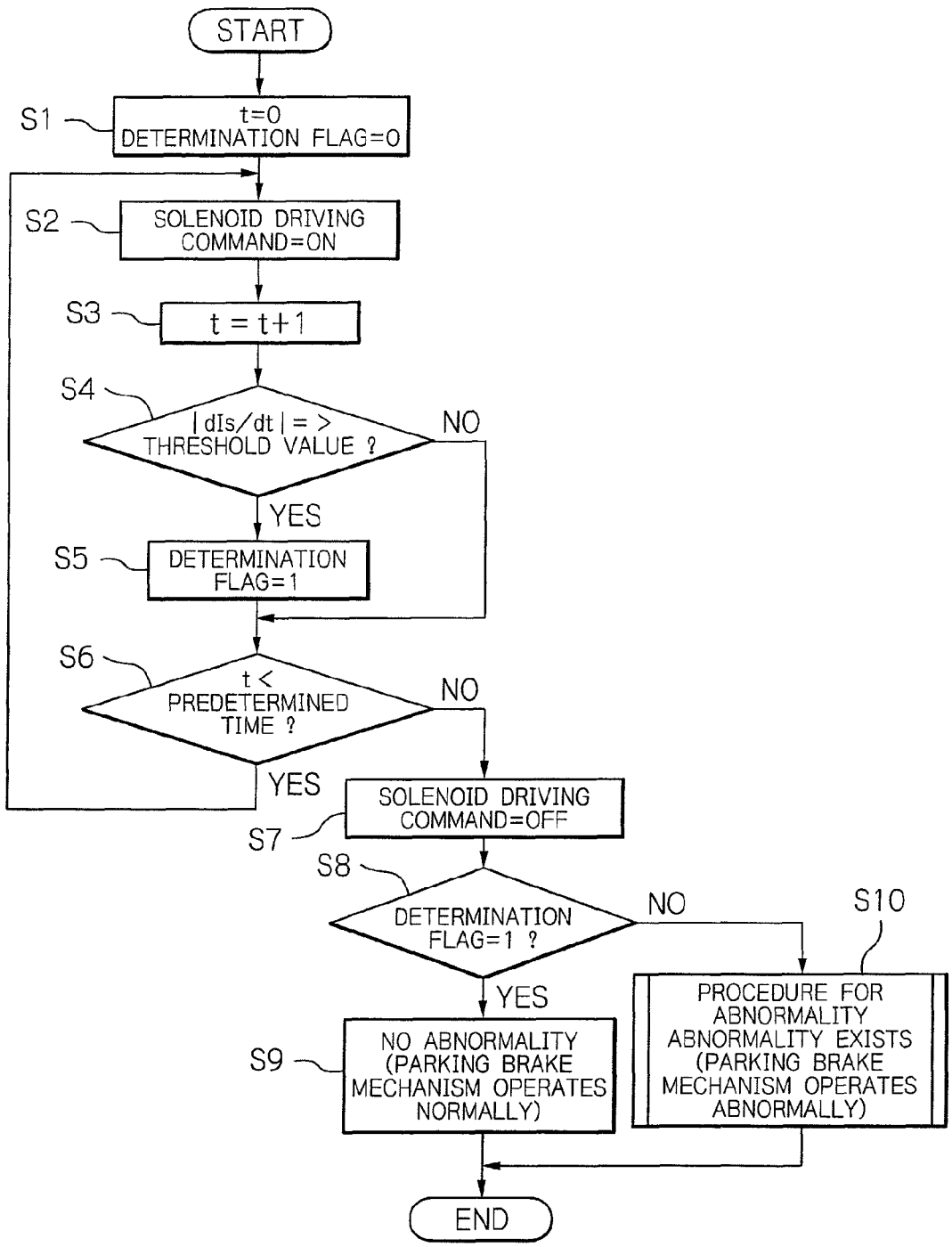
FIG. 4 is a flow chart showing an abnormality determination control performed in the parking brake mechanism of the electric disk brake shown in FIG. 1.

Referring to FIG. 4, at step S1, a timer counter is reset (t=0) and an abnormality determination flag is cleared (the abnormality determination flag=0). At step S2, a control electric current is supplied to the solenoid 25. At step S3, the count of the timer is incremented (t=t+1). At step S4, it is determined whether a time-rate-of-change dIs/dt of an electric current Is of the solenoid 25 is equal to or larger than a predetermined threshold value. If the time-rate-of-change dIs/dt is equal to or larger than the threshold value, the flow proceeds to step S5 where the abnormality determination flag is set (the determination flag=1). Then, the flow proceeds to step S6. On the other hand, if the time-rate-of-change dIs/dt is smaller than the threshold value, then the flow directly proceeds to step S6.

At step S6, the elapsed time is counted. If a predetermined time has not passed yet, then the flow returns to step S2. If the predetermined time has passed, then the flow proceeds to step S7 where the application of the electric current to the solenoid 25 is stopped, and then the flow proceeds to step S8. At step S8, it is determined whether the abnormality determination flag is set. If the determination flag is set (the determination flag=1), then the flow proceeds to step S9 where it is determined that the parking brake mechanism operates normally. On the other hand, if the determination flag is unset (the determination flag=0), then the flow proceeds to step S10 where a predetermined procedure for an abnormality situation is performed, such as an issue of warning with use of an indicator such as a warning light or a warning buzzer, and a cancel of re-performing of the parking brake operation while the vehicle is parked.

Figure 5:
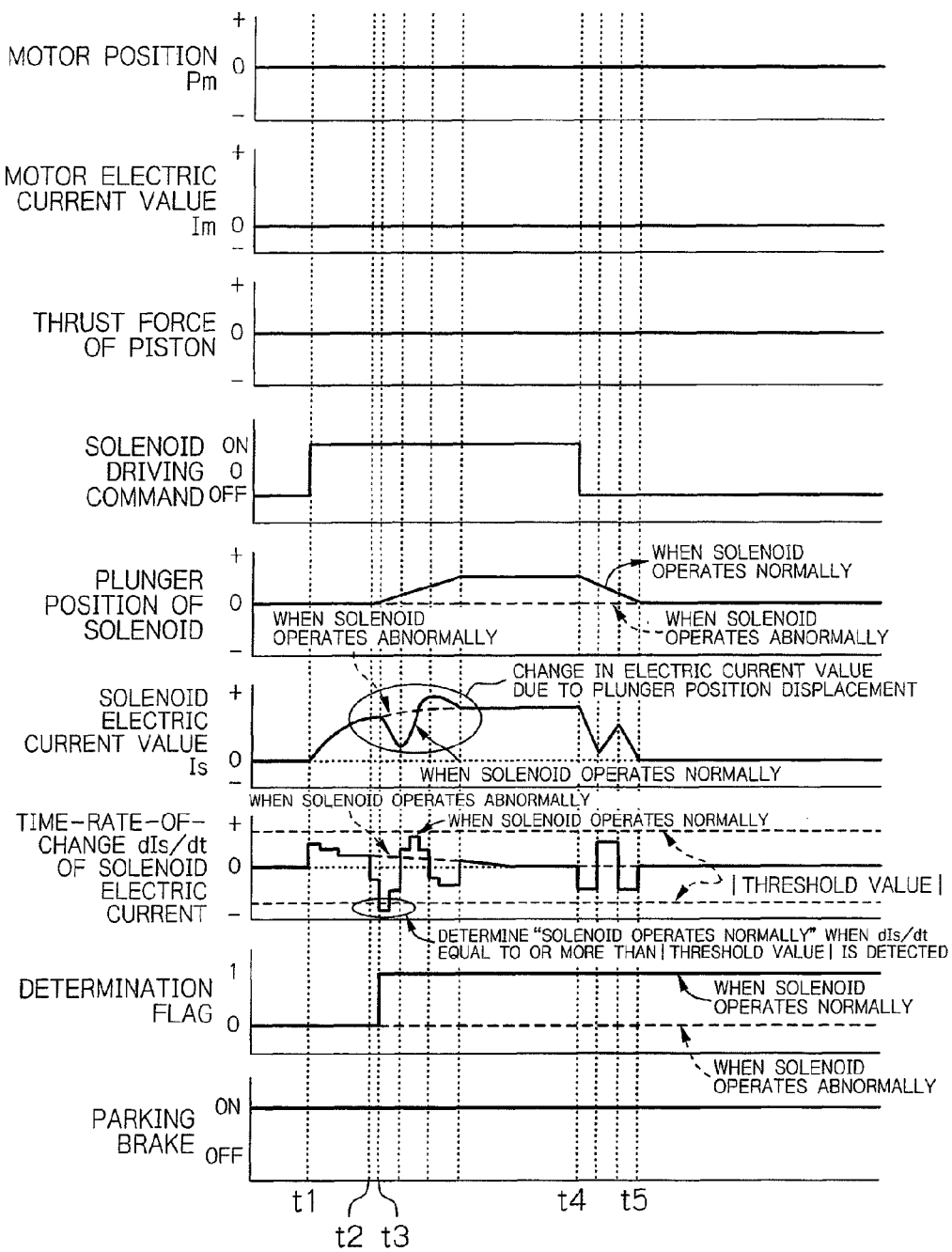
FIG. 5 is a time chart of the abnormality determination control performed in the parking brake mechanism of the electric disk brake shown in FIG. 1.

Now, the above-mentioned abnormality determination control will be described in terms of time series with reference to the time chart shown in FIG. 5. Referring to FIG. 5, the abnormality determination control is started. At time t1, application of an electric current to the solenoid 25 is started, and the time-rate-of-change dIs/dt of the electric current is monitored. If the parking brake mechanism 21 operates normally, at time t2, the plunger 29 starts to move and the electric current supplied to the solenoid 25 is changed accordingly. At time t3, the time-rate-of-change dIs/dt of the electric current reaches the threshold value, and therefore the abnormality determination flag is set. Since the play P is provided at the coupling portion of the plunger 29 and the engagement pawl 24, the plunger 29 can move in the axial direction thereof within the range of the play P, if the parking brake mechanism 21 operates normally.

On the other hand, as indicated by the broken line in FIG. 5, if the plunger 29 does not move, the time-rate-of-change dIs/dt of the electric current does not reach the threshold value, and therefore the abnormality determination flag remains unset. After that, at time t4, when the application of the electric current to the solenoid 25 is stopped, the plunger 29 is returned to its original position by receiving the spring force of the coil spring, and is stopped at time t5.

In the first embodiment, the abnormality determination control is performed by monitoring a behavior of the plunger 29 of the solenoid 25 while the parking brake is in operation (the state shown in FIG. 3(c)). Alternatively, the abnormality determination control may be performed by monitoring a behavior of the plunger 29 when the parking brake is being actuated (when the parking brake mechanism 21 is being brought from the state shown in FIG. 3(A) into the state shown in FIG. 3(B)).

In the following, a second embodiment of the present invention will be described with reference to FIG. 6. Since the parking brake mechanism of the second embodiment is only partially different from the first embodiment, for the second embodiment, like components are denoted by like reference numerals as of the first embodiment, only drawings showing main portions of the parking brake mechanism are provided and only components different from the first embodiment will be described in detail for the sake of avoiding redundancy.

As shown in FIG. 6, in the parking brake mechanism of the second embodiment, in a normal state, the engagement pawl 24 abuts against a stopper 32 by receiving a spring force of a coil spring 33, and the engagement portion 28 is disengaged from the tooth 27 of the ratchet wheel 22. A plunger 35 of a solenoid actuator 34 (hereinafter referred to as "solenoid 34") is situated at a retracted position by receiving a spring force of a return spring 36. Application of an electric current to the solenoid 34 causes the plunger 35 to protrude and the engagement pawl 24 to rotate against the spring force of the coil spring 33, whereby the engagement portion 28 is engaged with the tooth 27 of the ratchet wheel 22. As shown in FIG. 6(c), a predetermined play P is provided between the engagement pawl 24 and the plunger 35 while the engagement portion 28 is engaged with the tooth 27 and the plunger 35 is situated at a retracted position by receiving the spring force of the return spring 36.

At this time, although the engagement portion 28 is biased in the direction causing the engagement portion 28 to be disengaged from the tooth 27 of the ratchet wheel 22 by receiving the spring force of the coil spring 33, the engagement portion 28 and the tooth 27 of the ratchet wheel 22 are maintained in the engaged sate, since the ratchet wheel 22 is biased in the counterclockwise direction in the drawings due to the pressing force of the brake pads 3A and 3B against the disk rotor D, and therefore the engagement portion 28 of the engagement pawl 24 is securely engaged with the tooth 27 of the ratchet wheel 22.

Due to this arrangement, while the parking brake is actuated, i.e., the engagement portion 28 of the engagement pawl 24 is engaged with the tooth 27 of the ratchet wheel 22 (refer to FIG. 6 (C)), the plunger 35 is movable in the axial direction thereof within the range of the play P without causing a rotation of the engagement pawl 24. Therefore, the abnormality determination of the parking brake mechanism 21 can be performed by applying an electric current to the solenoid 34 and monitoring a behavior of the plunger 35 while the engagement portion 28 is engaged with the tooth 27.

In the following, a third embodiment of the present invention will be described with reference to FIGS. 7 and 8. Like components are denoted by like reference numerals as of the first embodiment, and only components different from the first embodiment will be described in detail.

Figure 7:
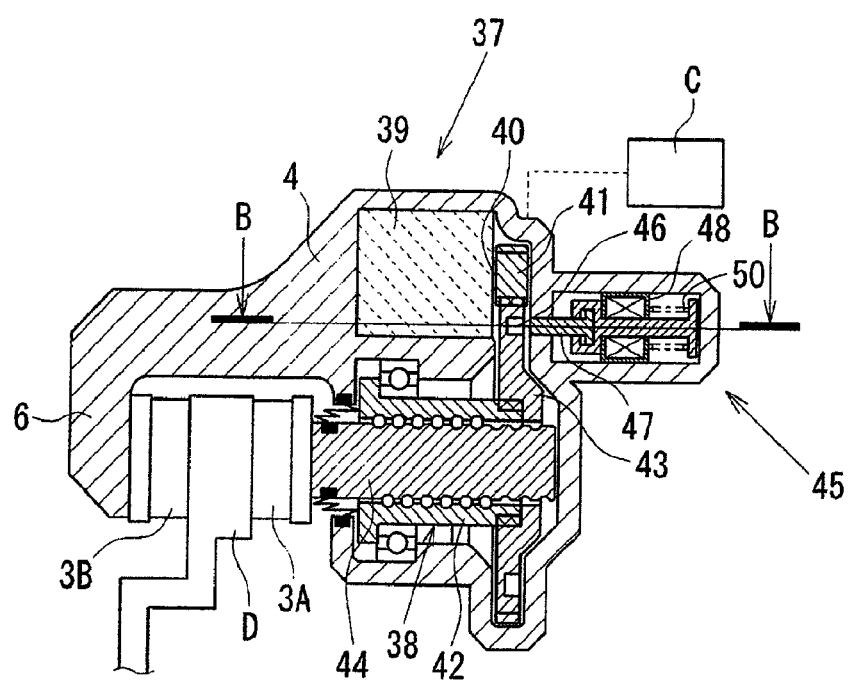
FIG. 7 is a vertical cross-sectional view schematically showing an electric disk brake according to a third embodiment of the present invention.

As shown in FIG. 7, an electric disk brake 37 of the third embodiment comprises a ball screw mechanism 38 as a rotation-liner motion converting mechanism. A rotation of a shaft 40 of a motor 39 is slowed down and transmitted to a rotation member 42 by engagement between a pinion 41 attached to the shaft 40 and a spur wheel 43 attached to the rotation member 42 of the ball screw mechanism 38. A rotational motion of the rotation member 42 is converted by the ball screw mechanism 38 into a linear motion of a linear motion member 44 serving as a piston so that the brake pads 3A and 3B are pressed against the disk rotor D, whereby a brake force is generated.

A parking brake mechanism 45 is disposed at the electric disk brake 37. The parking brake mechanism 45 is configured as follows. A plurality of engagement holes 46 are circumferentially formed at the spur wheel 43, and the spur wheel 43 is prevented from rotating by inserting an engagement pin 47 into one of the engagement holes 46. The engagement pin 47 is coupled to a tip portion of a plunger 49 of a solenoid actuator 48 (hereinafter referred to as "solenoid 48"). The spur wheel 43 is prevented from rotating by projecting the plunger 49 of the solenoid 48 and thereby inserting the engagement pin 47 into the engagement hole 46. In a normal state, the plunger 49 is situated at a retracted position due to a spring force of a return spring 50, and application of an electric current to the solenoid 48 causes the plunger 49 to protrude and thereby the engagement pin 47 to be inserted into one of the engagement holes 46.

As shown in FIGS. 8(B) and 8(C), a certain play P extending in the axial direction is provided at the coupling portion of the engagement pin 47 and the plunger 49, and the plunger 49 can protrude and be retracted within the range of the play P while the engagement pin 47 is inserted in the engagement hole 46.

Due to this arrangement, while the brake is in operation, this braked state is maintained even when the application of the electric current to the solenoid 48 is stopped, by inserting the engagement pin 47 into the engagement hole 46 so that the spur wheel 43 is prevented from rotating. In this way, the parking brake control can be performed.

Since the play P is provided at the coupling portion of the plunger 49 and the engagement pin 47, while the parking brake is in operation, i.e., the engagement pin 47 is inserted into the engagement hole 46 (refer to FIGS. 8(B) and 8(C)), the plunger 49 is movable in the axial direction within the range of the play P without causing a movement of the engagement pin 47. Therefore, it is possible to determine whether the parking brake mechanism 45 operates normally or abnormally, by applying an electric current to the solenoid 48, monitoring a behavior of the plunger 49, and checking whether the plunger 49 moves or not.

Figure 9:
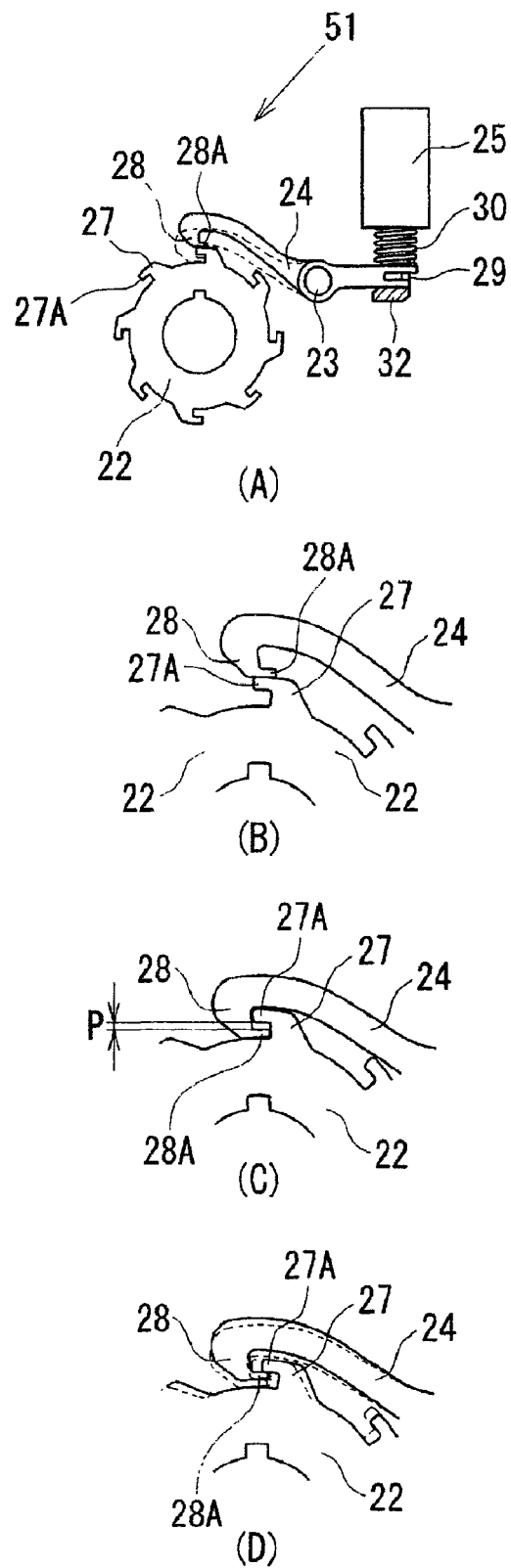
FIG. 9s(A)-(D) are schematic views showing actuation of a parking brake mechanism of an electric disk brake according to a fourth embodiment of the present invention.

In the following, a fourth embodiment of the present invention will be described with reference to FIGS. 9 to 11. Since the parking brake mechanism and the parking brake control performed by the control apparatus C of the fourth embodiment are different from the first embodiment shown in FIGS. 1 to 5, for the fourth embodiment, like components are denoted by like reference numerals as of the first embodiment, only drawings showing main portions of the parking brake mechanism are provided and only components different from the first embodiment will be described in detail.

As shown in FIGS. 9(A) and 9(B), in the electric disk brake in the fourth embodiment, a parking brake mechanism 51 comprises protrusions 27A and 28A respectively formed at the tip portions of the tooth 27 of the ratchet wheel 22 and the engagement portion 28 of the engagement pawl 24 which are engaged with each other. The protrusions 27A and 28B respectively protrude in the tangential direction of the ratchet wheel 22. As shown in FIG. 9(C), a play P extending in the radial direction of the ratchet wheel 22 is provided at the engagement portion of the tooth 27 and the engagement portion 28, i.e., between the protrusions 27A and 28A. Due to provisions of the protrusions 27A and 28A, as shown in FIG. 9(D), it is possible to rotate the engagement pawl 24 within the range of the play P while the tooth 27 and the engagement portion 28 are engaged with each other, by slightly rotating the ratchet wheel 22 in the brake applying direction by the electric motor 16 and releasing a load that the ratchet wheel 22 applies to the engagement pawl 24. On the other hand, no play is provided at the coupling portion of the engagement pawl 24 and the plunger 29 of the solenoid 25.

The parking brake mechanism 51 configured as mentioned above enables abnormality determination of the parking brake mechanism 51 in the following manner.

While the parking brake is in operation as shown in FIG. 9(C), i.e., the tooth 27 of the ratchet wheel 22 and the engagement portion 28 are engaged with each other, a load that the ratchet wheel 22 applies to the engagement pawl 24 is released by slightly rotating the ratchet wheel 22 in the brake applying direction by the electric motor 16. At this time, the ratchet wheel 22 rotates by an angle not causing the engagement portion 28 to be disengaged from the tooth 27 (refer to FIG. 9(D)). While the parking brake mechanism 51 is in this state, since the engagement pawl 24 can rotate within the range of the play P, it is possible to determine whether the parking brake mechanism 51 operates normally or abnormally by applying an electric current to the solenoid 25, monitoring a behavior of the plunger 29 and checking whether the plunger 29 moves or not.

In the following, an exemplary control flow of the abnormality determination control performed by the abnormality determining unit of the control apparatus C will be described with reference to the flow chart of FIG. 10. The below-mentioned control flow includes determination whether the brake caliper main body operates normally or abnormally, determination whether the re-clamp operation should be performed, and determination whether the parking brake mechanism operates normally or abnormally.

Figure 10:
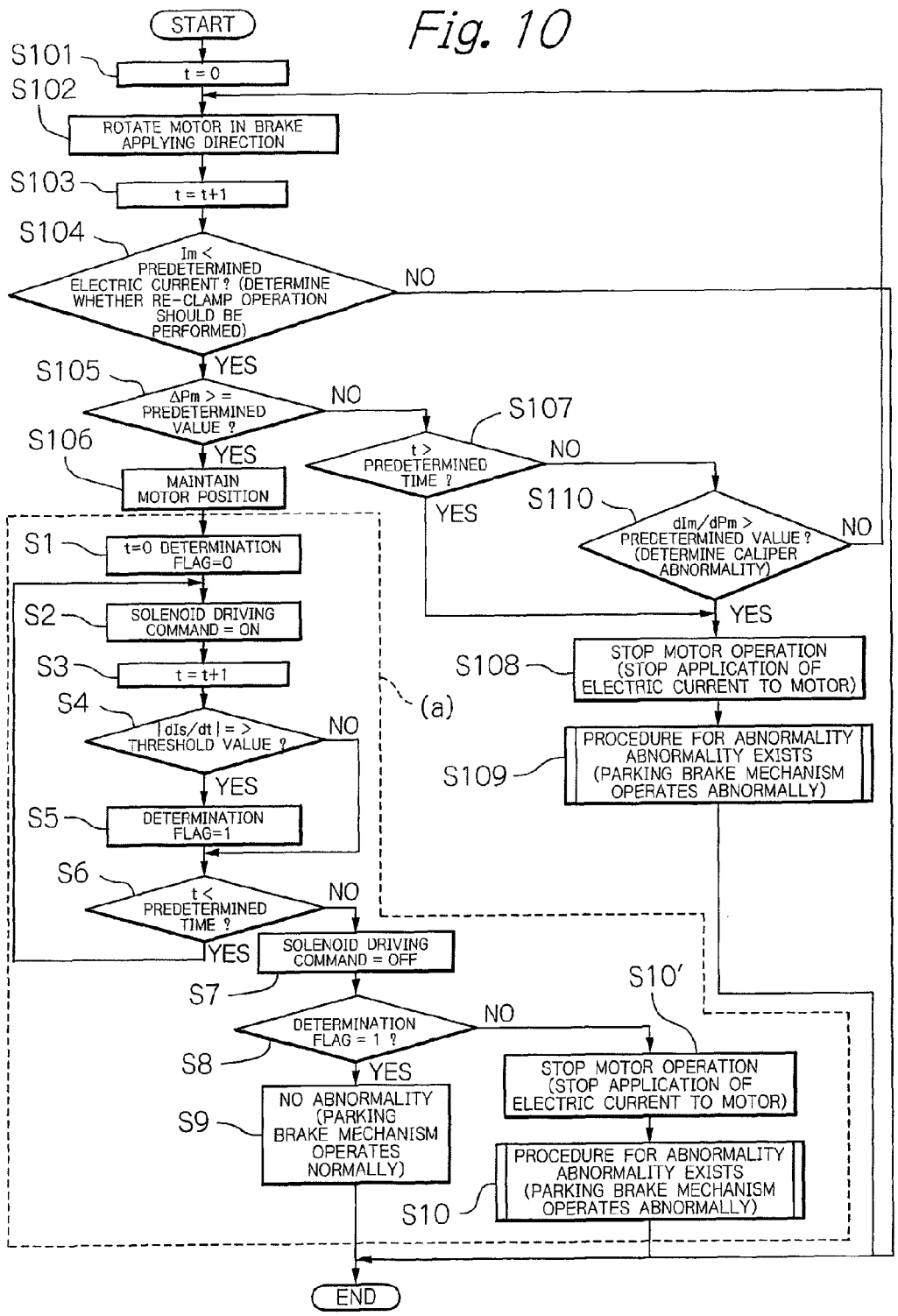
FIG. 10 is a flow chart showing an abnormality determination control performed in the electric disk brake of the fourth embodiment of the present invention.
Figure 11:
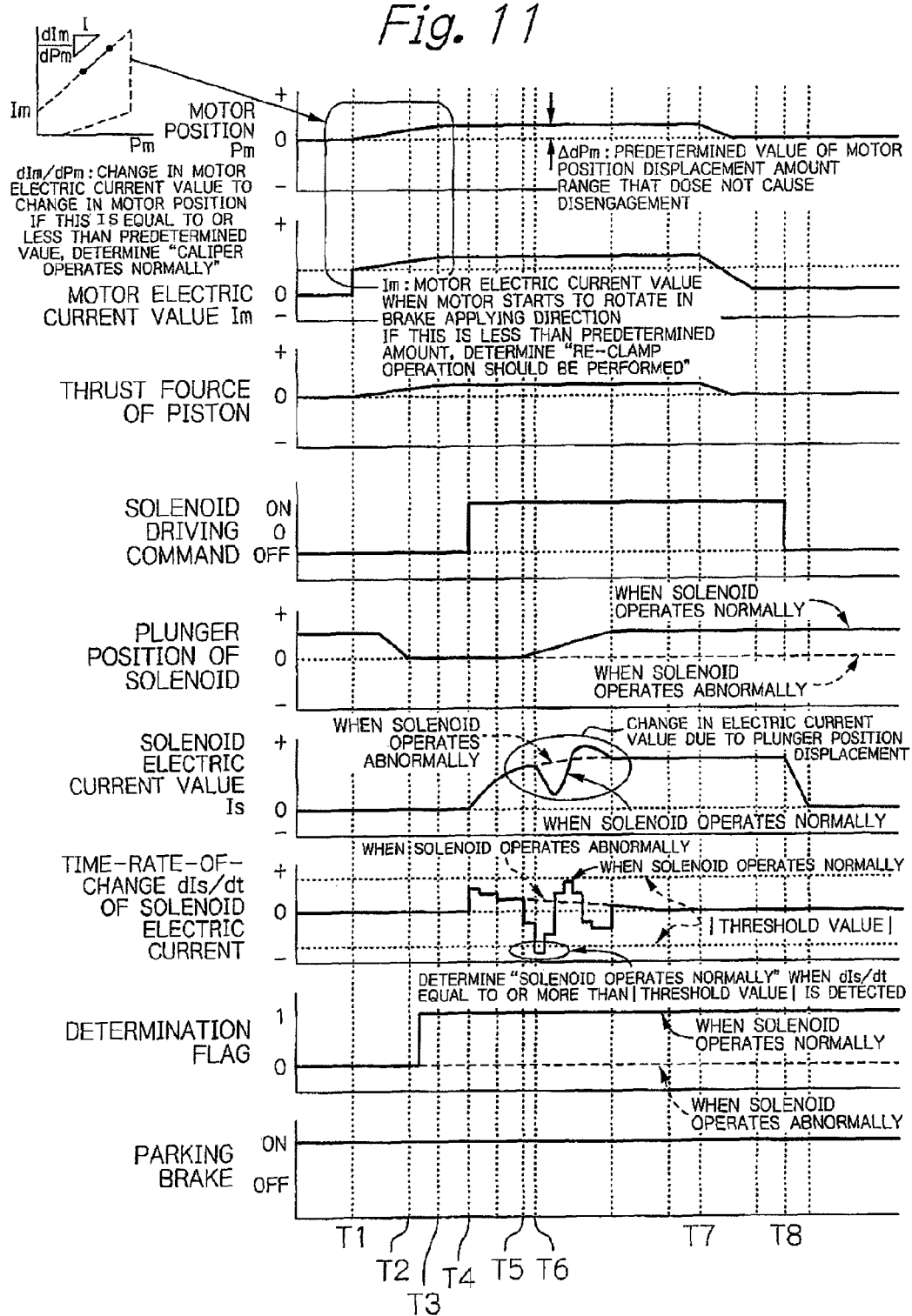
FIG. 11 is a time chart of the abnormality determination control performed in the electric disk brake of the fourth embodiment of the present invention.

Referring to FIG. 10, at step S101, a count of a timer is reset (t=0). At step S102, the electric motor 16 is rotated in the brake applying direction. At step S103, the count of the timer is incremented (t=t+1). At step S104, a conduction current Im of the electric motor 16 is monitored, and it is determined whether the conduction current Im is less than a predetermined electric current. If the conduction current Im is less than the predetermined electric current, then it is determined that the re-clamp operation should be performed, and the flow proceeds to step S105. On the other hand, if the conduction current Im is equal to or more than the predetermined electric current, then it is determined that the re-clamp operation is not necessary, and the current routine is ended. In this way, since it is possible to detect a load of the electric motor 16, i.e., the brake force by monitoring the conduction current Im of the electric motor 16, it can be determined whether the re-clamp operation should be performed.

At step S105, a rotational angle ΔPm of the electric motor 16 is monitored, and it is determined whether the rotational angle ΔPm reaches a predetermined value that does not cause the engagement portion 28 of the engagement pawl 24 to be disengaged from the tooth 27 of the ratchet wheel 22. If the rotational angle ΔPm of the electric motor 16 reaches the predetermined angle, then the flow proceeds to step S106 where the rotational position of the electric motor 16 is maintained. After that, a routine (a) for determining an abnormality of the parking brake mechanism is performed according to the steps within the broken line shown in FIG. 10. On the other hand, if the rotational angle ΔPm of the electric motor 16 does not reach the predetermined angle, then a routine for determining an abnormality of the brake caliper main body is performed according to steps S107 to S110.

The parking brake mechanism abnormality determination routine (a) is similar to the control flow of the before-discussed first embodiment which is shown in FIG. 4, except that the routine (a) additionally comprises step S10'. Therefore, like parts are denoted by like reference numerals, and descriptions thereof are not repeated for the sake of avoiding redundancy. According to the parking brake mechanism abnormality determination routine (a), it is determined at step S8 whether the abnormality determination flag is set or unset, and if the abnormality determination flag is unset (the abnormality determination flag=0), the flow proceeds to step S10' before proceeding to step S10. At step S10', the application of the electric current to the electric motor 16 is stopped, and the electric disk brake is returned to the normal parking brake actuated state. Then, the flow proceeds to step 10.

On the other hand, if it is determined at step S105 that the rotational angle ΔPm of the electric motor 16 does not reach the predetermined value, then the flow proceeds to step S107 where the elapsed time is counted. If a predetermined time period has passed, it is determined that the electric motor 16 operates abnormally, and the flow proceeds to step S108 where the application of the electric current to the electric motor 16 is stopped. Then, at step S109, a procedure for a brake abnormality is performed, such as an issue of warning with use of an indicator such as a warning light or a warning buzzer. In this flow, an abnormality of the electric motor 16 is determined by detecting an insufficient rotation of the electric motor 16 after the predetermined time has passed.

At step S107, if the predetermined time has not passed yet, then the flow proceeds to step S110. At step S110, dIm/dPm, which is a value of a change dPm in a rotational position Pm of the electric motor 16 relative to a change dIm in the conduction current Im of the electric motor 16, is calculated. If a value of dIm/dPm exceeds a predetermined value, then it is determined that some abnormality occurs in the brake caliper main body, and the flow proceeds to step S108 where the application of the electric current to the electric motor 16 is stopped. Then, at step S109, the above-mentioned procedure for a brake abnormality is performed. On the other hand, if the value of dIm/dPm does not exceed the predetermined value, then it is determined that the caliper main body operates normally, and the flow returns to step S102 to continue the timer count.

According to this process, it is determined whether the re-clamp operation should be performed and whether the parking brake mechanism operates normally, before the re-clamp operation is performed. Therefore, it is possible to prevent the parking brake from being unintentionally released, which otherwise might occur by performing the re-clamp operation when the parking brake mechanism operates abnormally.

In the above-discussed control flow, it is determined whether the brake operates normally or abnormally and whether the re-clamp operation should be performed, based on the conduction current of the electric motor 16 and the rotational position of the electric motor 16. However, a means for directly detecting a brake force may be provided, and on the basis of the brake force directly detected thereby, it may be determined whether the brake operates normally or abnormally and whether the re-clamp operation should be performed.

Now, the above-mentioned abnormality determination control will be described in terms of the time series with reference to the time chart shown in FIG. 11. Referring to FIG. 11, the abnormality determination control is started. At time t1, application of an electric current to the electric motor 16 is started, and the conduction current Im and the rotational position Pm of the electric motor 16 are monitored. A value of the dIm/dPm, which the change dPm in the rotational position Pm of the electric motor 16 relative to the change dIm in the conduction current Im, is calculated. At time T2, a load applied from the ratchet wheel 22 to the engagement pawl 24 is released by a rotation of the ratchet wheel 22 in the brake applying direction, whereby the engagement pawl 24 rotates within the range of the play P by receiving the spring force of the compression spring 30, and the plunger 29 moves. At time T3, the rotational position Pm of the electric motor 16 reaches the predetermined position, and this position is maintained.

At time T4, application of an electric current to the solenoid 25 is started, and the time-rate-of-change dIs/dt of the electric current is monitored. If the parking brake mechanism 21 operates normally, at time t5, the plunger 29 starts to move and the conduction current of the solenoid 25 is changed accordingly. At time t6, the time-rate-of-change dIs/dt of the electric current reaches the threshold value, and therefore the abnormality determination flag is set. As indicated by the broken line in FIG. 11, if the plunger 29 does not move, the time-rate-of-change dIs/dt of the electric current does not reach the threshold value, and therefore the abnormality determination flag remains unset.

After that, the application of the electric current to the electric motor 16 is stopped at time t7, and the application of the electric current to the solenoid 25 is stopped at time T8. At this time, since the electric motor 16 is stopped, a load due to the reactive force of the brake pads 3A and 3B is applied from the ratchet wheel 22 to the engagement pawl 24, whereby the positions of the engagement pawl 24 and the plunger 29 are maintained.

In the following, a fifth embodiment of the present invention will be described with reference to FIG. 12. The fifth embodiment is similar to the fourth embodiment shown in FIGS. 9 to 11, except that the fifth embodiment comprises the electric disk brake shown in FIG. 7, and a partially modified parking brake mechanism. Therefore, for the fifth embodiment, like components are denoted by like reference numerals, only FIG. 12 showing main portions of the parking brake mechanism are provided and only different components will be described in detail.

As shown in FIG. 12, in the electric disk brake of the fifth embodiment, a parking brake mechanism 52 comprises a plurality of engagement holes 52 circumferentially formed through the spur wheel 43. The spur wheel 43 is prevented from rotating by inserting an engagement pin 53 into one of the engagement holes 52. The engagement pin 53 is integrally coupled to the tip portion of the plunger of the solenoid 48. The spur wheel 43 is prevented from rotating by projecting the plunger 49 of the solenoid 48 and thereby inserting the engagement pin 53 into the engagement hole 52. In a normal state, the plunger 49 is situated at a retracted position due to the spring force of the return spring 50, and application of an electric current to the solenoid 48 causes the plunger 49 to protrude and thereby the engagement pin 53 to be inserted into one of the engagement holes 52.

A large-diameter flange portion 53A is formed at the tip of the engagement pin 53. The flange portion 53A has a smaller diameter than that of the engagement hole 52, thereby being able to be inserted in the engagement hole 52. An axially extending play P is provided between the position where the engagement pin 53 extends through the engagement hole 52 and abuts at the tip thereof against a stopper 54 (refer to FIG. 12(B)), and the position where the end of the flange portion 53A abuts against the edge of the engagement hole 52 (refer to FIG. 12(C)), whereby the engagement pin 53 is movable within the range of the play P while the engagement pin 53 extends through the engagement hole 52.

Due to this arrangement, while the brake is in operation, this braked state is maintained even when the application of the electric current to the solenoid 48 is stopped, by inserting the engagement pin 53 into the engagement hole 52 so that the spur wheel 43 is prevented from rotating. In this way, the parking brake control can be performed.

Abnormality determination of the parking brake mechanism is performed in the following manner. While the parking brake is actuated as shown in FIG. 12(B), i.e., the engagement pin 53 is inserted in the engagement hole 52 of the spur wheel 43, the spur wheel 43 is slightly rotated in the brake applying direction by the electric motor 39 so that a load applied from the spur wheel 43 to the engagement pin 53 is released. The rotational angle of the spur wheel 43 at this time is such that the end of the flange portion 53A of the engagement pin 53 can abut against the edge of the engagement hole 52 (refer to FIG. 12(C)). In this state, the engagement pin 53 is axially movable within the range of the play P. Therefore, application of an electric current to the solenoid 48 is started, and monitoring a behavior of the plunger 49 is monitored, whereby it can be determined whether the parking brake mechanism 52 operates normally or abnormally based on whether the plunger 49 moves or not.

It may be determined whether the plunger 49 moves by detecting a position of the plunger 49 with use of a potentiometer 60 (position sensor) shown in FIG. 12.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2008-221799, filed on Aug. 29, 2008.

The entire disclosure of Japanese Patent Application No. 2008-221799 filed on Aug. 29, 2008 including specification, claims, drawings and summary is incorporated herein by reference in its entirety.

What is claimed is:

1. An electric disk brake for generating a brake force by converting a rotational motion of a motor into a linear motion so as to advance a piston, and for pressing a brake pad against a disk rotor with the piston, the electric disk brake comprising:
   a parking brake mechanism including a solenoid, a plunger, and a lock mechanism, the parking brake mechanism being operable to hold a generated brake force by causing the solenoid to move the plunger in an actuating direction so as to actuate the lock mechanism; and
   a control apparatus operable to control the solenoid;
   wherein the parking brake mechanism includes a play between the plunger and the lock mechanism or in the lock mechanism, the play allowing the plunger to be moved in the actuating direction at least while the lock mechanism is in a locked state; and
   wherein the control apparatus includes a parking brake mechanism abnormality determining unit operable to determine whether the parking brake mechanism operates normally or abnormally by applying an electric current to the solenoid so as to cause a movement of the plunger within the play while the lock mechanism is in the locked state.

2. The electric disk brake according to claim 1, wherein the parking brake mechanism abnormality determining unit determines that the parking brake mechanism operates normally if the parking brake mechanism abnormality determining unit detects movement of the plunger within the play, and determines that the parking brake mechanism operates abnormally if the parking brake mechanism abnormality determining unit detects no movement of the plunger within the play.

3. The electric disk brake according to claim 2, wherein whether or not the plunger is moved is detected based on an electric current supplied to the solenoid.

4. The electric disk brake according to claim 3, wherein the parking brake mechanism abnormality determining unit determines that the parking brake mechanism operates normally if the electric current supplied to the solenoid is reduced due to the movement of the plunger, and determines that the parking brake mechanism operates abnormally if the electric current supplied to the solenoid continues to increase during a predetermined time period.

5. The electric disk brake according to claim 2, wherein whether or not the plunger is moved is detected based on a position of the plunger.

6. The electric disk brake according to claim 2, wherein whether or not the plunger is moved is detected based on a change in an inductance of the solenoid.

7. The electric disk brake according to claim 1, further comprising a motor abnormality determining unit operable to determine whether the motor operates normally or abnormally by trying to rotate the motor in a direction causing the brake pad to be pressed against the disk rotor.

8. The electric disk brake according to claim 1, wherein the control apparatus is operable to initiate a re-clamp operation in which the parking brake mechanism is re-actuated, and
   wherein the control apparatus prohibits the re-clamp operation if the parking brake mechanism abnormality determining unit determines that the parking brake mechanism operates abnormally.

9. The electric disk brake according to claim 8, wherein, in a case where a vehicle has the electric disk brake for each of a plurality of wheels, when the re-clamp operation is prohibited in one of the wheels, a force of pressing the brake pad against the disk rotor in the re-clamp operation is increased in the other wheels.

10. The electric disk brake according to claim 1, wherein the lock mechanism includes a ratchet wheel adapted to rotate according to the rotational motion of the motor, the ratchet wheel including a plurality of teeth, and an engagement pawl adapted to be engaged with any of the teeth of the ratchet wheel so as to prevent a rotation of the ratchet wheel,
   wherein the plunger is operable to cause the engagement pawl to be engaged any of the teeth of the ratchet wheel, and
   wherein the play is provided between the engagement pawl and the plunger for enabling the plunger to be moved.

11. The electric disk brake according to claim 1, wherein the lock mechanism includes a ratchet wheel adapted to rotate according to the rotational motion of the motor, the ratchet wheel including a plurality of teeth, and an engagement pawl adapted to be engaged with any of the teeth of the ratchet wheel so as to prevent a rotation of the ratchet wheel,
   wherein the plunger is operable to cause the engagement pawl to be engaged any of the teeth of the ratchet wheel, and wherein the play is provided between the engagement pawl and the teeth of the ratchet wheel for enabling the plunger to be moved.

12. An electric disk brake, comprising:
a motor;
a converting mechanism operable to convert a rotational motion of the motor into a linear motion;
a piston adapted to be advanced by the linear motion of the converting mechanism;
a brake pad adapted to be pressed against a disk rotor by the advance of the piston;
a parking brake mechanism including a solenoid, a plunger, and a lock mechanism, the parking brake mechanism being operable to hold a brake force generated by the pressure of the brake pad by causing the solenoid to move the plunger in an actuating direction so as to actuate the lock mechanism; and
a control apparatus operable to control the parking brake mechanism and the motor,
wherein the parking brake mechanism includes a play between the plunger and the lock mechanism or in the lock mechanism, the play allowing the plunger to be moved in the an actuating direction within a predetermined range that does not cause a release of a locked state of the lock mechanism, and
wherein the control apparatus includes a parking brake mechanism abnormality determining unit adapted to apply an electric current to the solenoid while the lock mechanism is in the locked state and detect whether or not the plunger moves, the parking brake mechanism abnormality determining unit determining that the parking brake mechanism operates normally if the plunger moves within the predetermined range and determining that the parking brake mechanism operates abnormally if the plunger does not move within the predetermined range.

13. The electric disk brake according to claim 12, further comprising a motor abnormality determining unit operable to determine whether the motor operates normally or abnormally by trying to rotate the motor in a direction causing the brake pad to be pressed against the disk rotor.

14. The electric disk brake according to claim 12, wherein the control apparatus is operable to initiate a re-clamp operation in which the parking brake mechanism is re-actuated, and
wherein the control apparatus prohibits the re-clamp operation if the parking brake mechanism abnormality determining unit determines that the parking brake mechanism operates abnormally.

15. The electric disk brake according to claim 12, wherein whether or not the plunger is moved is detected based on an electric current supplied to the solenoid.

16. The electric disk brake according to claim 12, wherein whether or not the plunger is moved is detected based on a change in an inductance of the solenoid.

17. An electric disk brake, comprising:
a motor;
a converting mechanism operable to convert a rotational motion of the motor into a linear motion;
a piston adapted to be advanced by the linear motion of the converting mechanism;
a brake pad adapted to be pressed against a disk rotor by the advance of the piston;
a parking brake mechanism operable to hold a brake force generated by the pressure of the brake pad; and
a control apparatus operable to control the parking brake mechanism and the motor; and
wherein the parking brake mechanism includes
(i) a ratchet wheel adapted to rotate according to the rotational motion of the motor, the ratchet wheel including a plurality of teeth,
(ii) an engagement pawl adapted to be engaged with any of the teeth of the ratchet wheel so as to prevent a rotation of the ratchet wheel,
(iii) a plunger operable to cause the engagement pawl to be engaged with one of the teeth of the ratchet wheel, and
(iv) a solenoid for moving the plunger in an actuating direction so as to actuate the engagement pawl;
wherein the parking brake mechanism includes a play between the engagement pawl and the teeth of the ratchet wheel or between the engagement pawl and the plunger, the play allowing the plunger to be moved in the actuating direction thereof while the engagement pawl is engaged with one of the teeth of the ratchet wheel; and
wherein the control apparatus comprises a parking brake mechanism abnormality determining unit adapted to apply an electric current to the solenoid while the engagement pawl is engaged with one of the teeth of the ratchet wheel and detect whether or not the plunger moves, the parking brake mechanism abnormality determining unit determining that the parking brake mechanism operates normally if the plunger moves within the play and determining that the parking brake mechanism operates abnormally if the plunger does not move.

18. The electric disk brake according to claim 17, wherein the parking brake mechanism abnormality determining unit determines that the parking brake mechanism operates normally if the electric current supplied to the solenoid is reduced due to the movement of the plunger, and determines that the parking brake mechanism operates abnormally if the electric current supplied to the solenoid continues to increase during a predetermined time period.

19. The electric disk brake according to claim 17, wherein the play is provided between the engagement pawl and an of the teeth of the ratchet wheel, and
wherein the control apparatus causes the motor to rotate the ratchet wheel in a direction causing the brake pad to be pressed against the disk rotor before the plunger is moved in determining whether the parking brake mechanism operates normally, so that a load acting between the engagement pawl and the tooth is released while the engagement between the engagement pawl and the tooth is kept.

20. The electric disk brake according to claim 19, further comprising a motor abnormality determining unit operable to determine whether the motor operates normally or abnormally when the ratchet wheel is provided through the motor with the force for the rotation in the direction causing the brake pad to be pressed against the disk rotor.

\* \* \* \* \*